United States Patent
Yun et al.

(10) Patent No.: US 8,900,465 B1
(45) Date of Patent: Dec. 2, 2014

(54) METHODS FOR REDUCING SURFACE ROUGHNESS OF MAGNETIC MEDIA FOR STORAGE DRIVES

(75) Inventors: Yang Yun, San Jose, CA (US); Xiaofeng Yao, San Jose, CA (US); Yi Chen, San Jose, CA (US); Paul C. Dorsey, Los Altos, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/539,103

(22) Filed: Jun. 29, 2012

(51) Int. Cl.
*B44C 1/22* (2006.01)
*G11B 5/84* (2006.01)

(52) U.S. Cl.
CPC ........................................ *G11B 5/84* (2013.01)
USPC ................... 216/22; 204/298.01; 204/298.02; 29/603.03; 29/603.07

(58) Field of Classification Search
CPC ........ G11B 5/8408; G11B 5/72; B82Y 10/00; H01L 43/12; H01L 21/31116; H01L 21/32135; H01L 21/32136
See application file for complete search history.

(56) References Cited

U.S. PATENT DOCUMENTS

| | | | |
|---|---|---|---|
| 5,227,211 A | 7/1993 | Eltoukhy | |
| 5,567,512 A | 10/1996 | Chen et al. | |
| 5,705,287 A | 1/1998 | Doerner et al. | |
| 5,714,044 A | 2/1998 | Lal et al. | |
| 5,855,746 A | 1/1999 | Prabhakara et al. | |
| 5,858,182 A | 1/1999 | Horng et al. | |
| 5,943,187 A * | 8/1999 | Chen et al. | 360/235.2 |
| 6,136,403 A | 10/2000 | Prabhakara et al. | |
| 6,524,687 B2 | 2/2003 | Horng et al. | |
| 6,613,422 B1 | 9/2003 | Ma et al. | |
| 7,018,729 B2 | 3/2006 | Pocker et al. | |
| 7,169,488 B2 | 1/2007 | Chen et al. | |
| 7,377,025 B2 | 5/2008 | Zhao et al. | |
| 7,950,136 B2 | 5/2011 | Zhao et al. | |
| 7,961,427 B2 | 6/2011 | Dorbeck et al. | |
| 2001/0031382 A1* | 10/2001 | Kusakawa et al. | 428/694 TC |
| 2005/0208341 A1* | 9/2005 | Morikawa et al. | 428/833.3 |
| 2007/0187227 A1* | 8/2007 | Marinero | 204/192.2 |
| 2010/0032643 A1* | 2/2010 | Xu | 257/4 |
| 2012/0012554 A1* | 1/2012 | Bian et al. | 216/22 |
| 2013/0264306 A1* | 10/2013 | Bian et al. | 216/22 |

* cited by examiner

*Primary Examiner* — Lan Vinh
*Assistant Examiner* — Jiong-Ping Lu

(57) ABSTRACT

Methods for reducing the surface roughness of magnetic media to be used in storage drives are described. One such method includes forming a recording media on a substrate, the recording media including at least one recording layer configured to store information magnetically, depositing a first layer of carbon on the recording media, the first carbon layer having a first average preselected thickness, etching the first carbon layer to have a second average preselected thickness less than the first average preselected thickness, depositing a second layer of carbon on the etched first carbon layer, the second carbon layer having a third average preselected thickness that is less than the first average preselected thickness, and implanting nitrogen in the second carbon layer.

18 Claims, 3 Drawing Sheets

METHODS FOR REDUCING SURFACE ROUGHNESS OF MAGNETIC MEDIA FOR STORAGE DRIVES

FIELD

The present invention relates generally to processes for manufacturing magnetic media for storage drives, and more specifically, methods for reducing the surface roughness of magnetic media to be used in storage drives.

BACKGROUND

A carbon overcoat with low surface roughness can be vital for reducing fly height to achieve high areal density. In current hard disk media, the surface roughness of the carbon overcoat is determined by the roughness of the magnetic layers. More specifically, the carbon overcoat is conformal so that the roughness of the media is largely determined by the media structure beneath the carbon. The carbon overcoat roughness is typically about 3.8 to 4.0 angstroms (Å) due to the columnar structure of the magnetic layers of media for perpendicular magnetic recording (PMR). In the case of energy-assisted magnetic recording (EAMR) type media, the carbon overcoat roughness is even higher (e.g., about 5 Å to 7 Å) due to the high temperature alloys used in the magnetic structure. One approach to reduce the surface roughness is to increase the carbon thickness. Increasing carbon thickness tends to planarize the media surface as carbon fills in the valleys between the media grain structure. However, the problem with simply increasing carbon thickness to reduce roughness is that the magnetic spacing (e.g., distance from the media surface to the magnetic recording layer) increases so recording performance degrades significantly.

SUMMARY

Aspects of the invention relate to methods for reducing the surface roughness of magnetic media to be used in storage drives. In one embodiment, the invention relates to a method for reducing surface roughness of magnetic media, the method including forming a recording media on a substrate, the recording media including at least one recording layer configured to store information magnetically, depositing a first layer of carbon on the recording media, the first carbon layer having a first average preselected thickness, etching the first carbon layer to have a second average preselected thickness less than the first average preselected thickness, depositing a second layer of carbon on the etched first carbon layer, the second carbon layer having a third average preselected thickness that is less than the first average preselected thickness, and implanting nitrogen in the second carbon layer.

DETAILED DESCRIPTION

Figure 1:
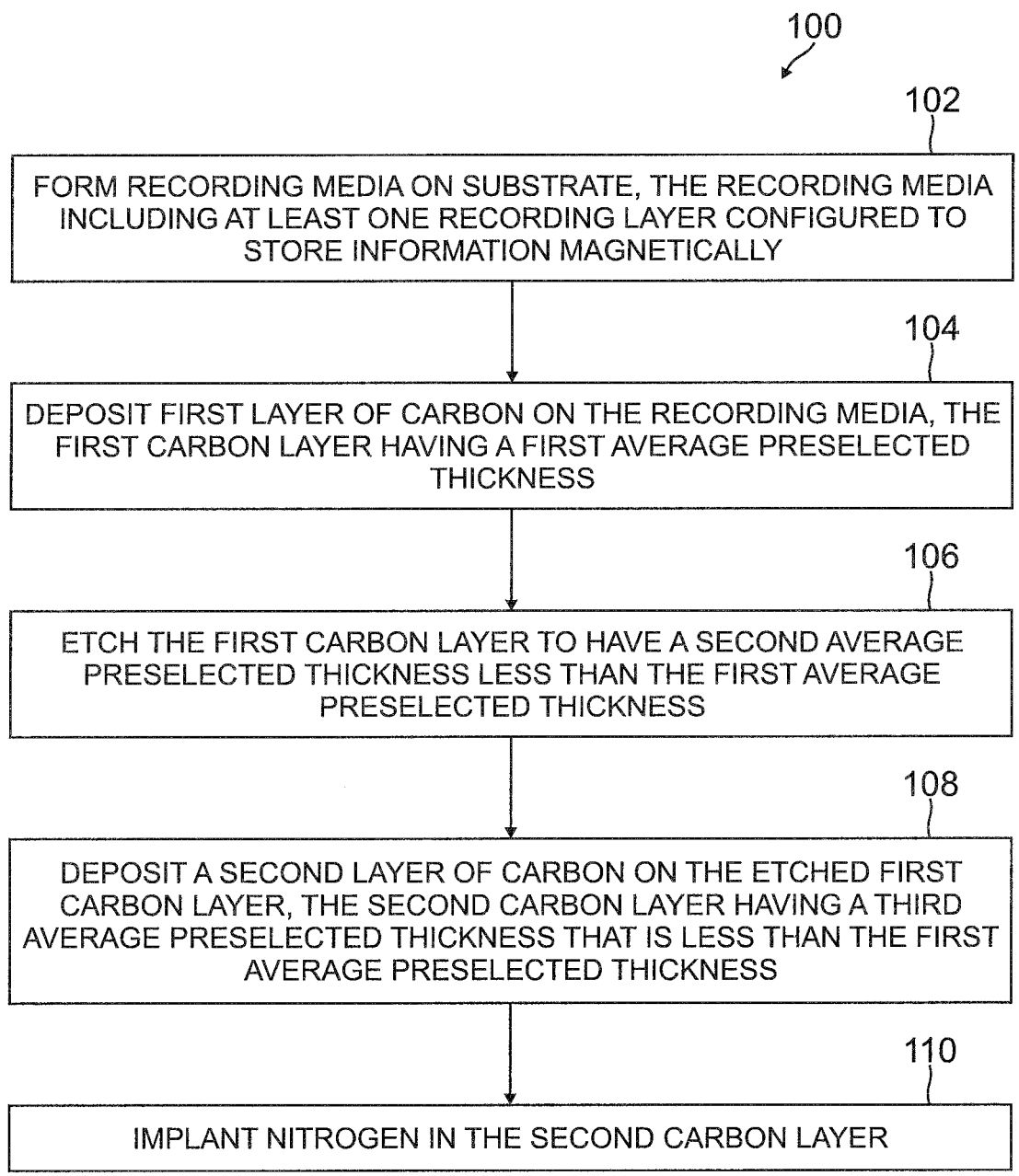
FIG. 1 is a flowchart of a general process for reducing the surface roughness of magnetic media for storage drives using carbon etching in accordance with one embodiment of the invention.

Referring now to the drawings, embodiments of processes for reducing the surface roughness of magnetic media for storage drives using carbon etching are illustrated. The processes include depositing a thick layer of carbon on a recording medium (e.g., media), etching back the thick carbon layer, depositing a thin layer of carbon to repair the media surface, and implanting nitrogen on the media surface to promote adhesion (e.g., lube adhesion). In a number of embodiments, the carbon etching and nitrogen implantation are performed using inductively coupled plasma. In a number of embodiments, the etching back of the thick carbon layer is performed such that a thickness of the remaining carbon layer is greater than zero at any peaks in the original recording media. In other words, in these embodiments, the thick carbon can be etched to be very thin but not so thin as to allow any of the peaks of the original recording media to extend to, or beyond, the carbon surface.

FIG. 1 is a flowchart of a general process 100 for reducing the surface roughness of magnetic media for storage drives using carbon etching in accordance with one embodiment of the invention. The process first forms (102) a recording medium (e.g., media) on a substrate, the recording media including at least one recording layer configured to store information magnetically. In a number of embodiments, the recording media has columnar grain structure with substantial surface roughness. For example, valleys in the recording media may have peak to valley distances of about 25 Å for PMR systems and about 40 Å for EAMR systems.

The process then deposits (104) a first layer of carbon on the recording media, the first carbon layer having a first average preselected thickness. In several embodiments, the first carbon layer is relatively thick (e.g., about 35 to about 40 Å depending on the type of recording system the media is used in).

The process then etches (106) the first carbon layer to have a second average preselected thickness less than the first average preselected thickness. In many embodiments, the etching has a smoothing effect on the carbon surface. In a number of embodiments, the etching is performed using inductively coupled plasma (ICP).

The process then deposits (108) a second layer of carbon (e.g., relatively thin layer of carbon) on the etched first carbon layer, the second carbon layer having a third average preselected thickness that is less than the first average preselected thickness. The deposition can be performed using sputtering or another suitable deposition method known in the art.

The process then implants (110) nitrogen in the second carbon layer (e.g., thin carbon layer that was previously deposited). In a number of embodiments, the implantation is performed using inductively coupled plasma which can provide better nitrogen uniformity and higher nitrogen implantation rates than other techniques.

In several embodiments, the resulting carbon overcoat has relatively low surface roughness with a thinner overcoat and better nitrogen uniformity than conventional approaches.

In one embodiment, the process can perform the sequence of actions in a different order. In another embodiment, the process can skip one or more of the actions. In other embodiments, one or more of the actions are performed simultaneously. In some embodiments, additional actions can be performed.

FIGS. 2a to 2d illustrate a sequence of cross sectional views of a magnetic media workpiece, and corresponding actions performed on the magnetic media workpiece in a process for reducing the surface roughness of the magnetic media using carbon etching in accordance with one embodiment of the invention.

Figure 2:
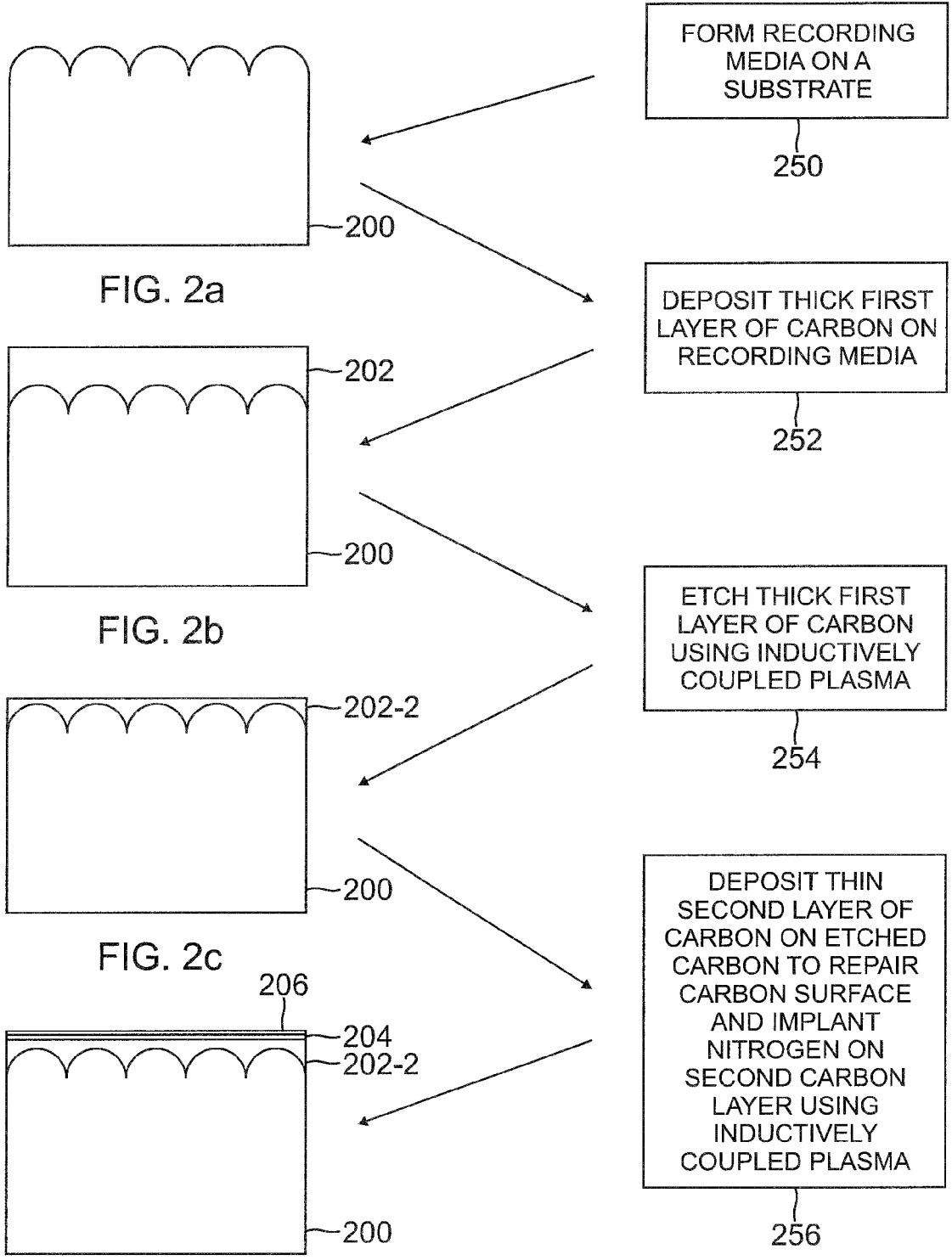
FIGS. 2a to 2d illustrate a sequence of cross sectional views of a magnetic media workpiece, and corresponding processing actions performed on the magnetic media workpiece in a process for reducing the surface roughness of magnetic media using carbon etching in accordance with one embodiment of the invention.

In FIG. 2a, the process first forms (250) a recording medium (e.g., media) on a substrate (not shown) to form a recording media workpiece 200, where the recording media workpiece 200 includes at least one recording layer configured to store information magnetically. Magnetic recording layers and processes for storing information therein, including PMR and EAMR systems, are well known in the art. In a number of embodiments, the recording media has columnar grain structure with substantial surface roughness (see for example the top surface of recording media workpiece 200). For example, the valleys in the recording media may have peak to valley distances of about 25 Å for PMR systems and about 40 Å for EAMR systems.

In FIG. 2b, the process then deposits (252) a first layer of carbon (e.g., thick carbon layer) 202 on the recording media workpiece 200, where the first carbon layer 202 has a first average preselected thickness. In several embodiments, the first carbon layer is relatively thick (e.g., about 35 to about 40 Å depending on the type of recording system the media is to configured be used in). In a number of embodiments, the first average preselected thickness is selected to be greater than a depth of any of the valleys in the recording media 200. In other words, in these embodiments, the first average preselected thickness is selected such that the first carbon layer 202 completely fills any and all valleys in the original recording media 200 and extends at least somewhat higher than any peaks in the original recording media 200.

In several embodiments, depositing the first layer of carbon on the recording media substantially reduces the roughness of a top surface of the recording media. In a number of embodiments, the first average preselected thickness is selected to be sufficiently thick as to substantially reduce the roughness of the top surface of the recording media.

In FIG. 2c, the process then etches (254) the first carbon layer to have a second average preselected thickness that is less than the first average preselected thickness. In many embodiments, the etching has a smoothing effect on the carbon surface and the etched first carbon layer 202-2 is smoother than the first carbon layer would have been without etching. In a number of embodiments, the etching is performed using inductively coupled plasma (ICP). In one embodiment, the inductively coupled plasma includes argon. In other embodiments, the inductively coupled plasma for etching can include other suitable materials (e.g., nitrogen or argon/helium). The ICP etching can have a high carbon etch rate (e.g., about 4.1 Å per second) which is superior to a number of other methods which can be as slow as about 1.0 Å per second.

In several embodiments, the etching is performed such that only a thin layer of carbon remains 202-2 (e.g., the second average preselected thickness is substantially less than the first average preselected thickness) above the peaks in the original recording media. Etching beyond the thin carbon layer may remove carbon in the valleys and the surface roughness will actually begin to increase. In one embodiment, the average thickness of the remaining carbon layer 202-2 or second average preselected thickness is about 15 Å. In one embodiment, the recording media is configured for PMR and the process etches back about 20 percent of the thick carbon layer. In another embodiment, the recording media is configured for EAMR and the process etches back about 80 to 90 percent of the thick carbon layer. In one embodiment, the process performs the ICP etching for about 10 seconds for an EAMR system, and about 1.5 seconds for a PMR system.

In FIG. 2d, the process deposits (256) a second layer of carbon (e.g., relatively thin layer of carbon) 204 on the etched first carbon layer 202-2, and then implants nitrogen 206 in the second carbon layer (e.g., thin carbon layer 204 that was previously deposited). The carbon deposition can be performed using sputtering or another suitable deposition method known in the art. In one embodiment, for example, the carbon deposition can be performed using chemical vapor deposition (CVD) or the like. In a number of embodiments, the second/thin layer of carbon 204 acts to restore or repair the carbon surface of the recording media workpiece 200 after the prior etching (e.g., second carbon layer 204 can restore surface smoothness and other characteristics such as glide yield). In several embodiments, the second carbon layer 204 has a third average preselected thickness that is substantially less than the first average preselected thickness for the thick carbon layer deposited in block 252. In one embodiment, the third average preselected thickness or thickness of the thin carbon layer 204 is about 5 to 10 Å.

In a number of embodiments, the nitrogen implantation 206 is performed using inductively coupled plasma which can provide better nitrogen uniformity and higher nitrogen implantation rates than other techniques. In several embodiments, the inductively coupled plasma includes nitrogen. In other embodiments, the inductively coupled plasma for implantation can include other suitable materials. In several embodiments, the implanted nitrogen 206 promotes lube adhesion and/or other beneficial effects.

In one embodiment, the ICP etching of block 254 and the ICP nitrogen implantation of block 256 are performed in the same chamber. In several embodiments, the resulting carbon overcoat has relatively low surface roughness with a thinner overcoat and better nitrogen uniformity than conventional approaches.

In one embodiment, the first average preselected thickness (e.g., thickness of thick carbon layer) is at least twice as much as a depth of any of the valleys in the recording media. In one embodiment, the first average preselected thickness of the first carbon layer (e.g., thickness of the thick carbon layer) is at least three times as much as the third average preselected thickness of the second carbon layer (e.g., thickness of the thin carbon layer). In several embodiments, the recording media includes a number of peaks separated by a number of valleys, and the deposition of the first layer of carbon (e.g., thick carbon layer) on the recording media includes filling each of the valleys in the recording media.

In one embodiment, the process corresponding with FIGS. 2a to 2d can perform the sequence of actions in a different order. In another embodiment, the process can skip one or more of the actions. In other embodiments, one or more of the actions are performed simultaneously. In some embodiments, additional actions can be performed.

Figure 3:
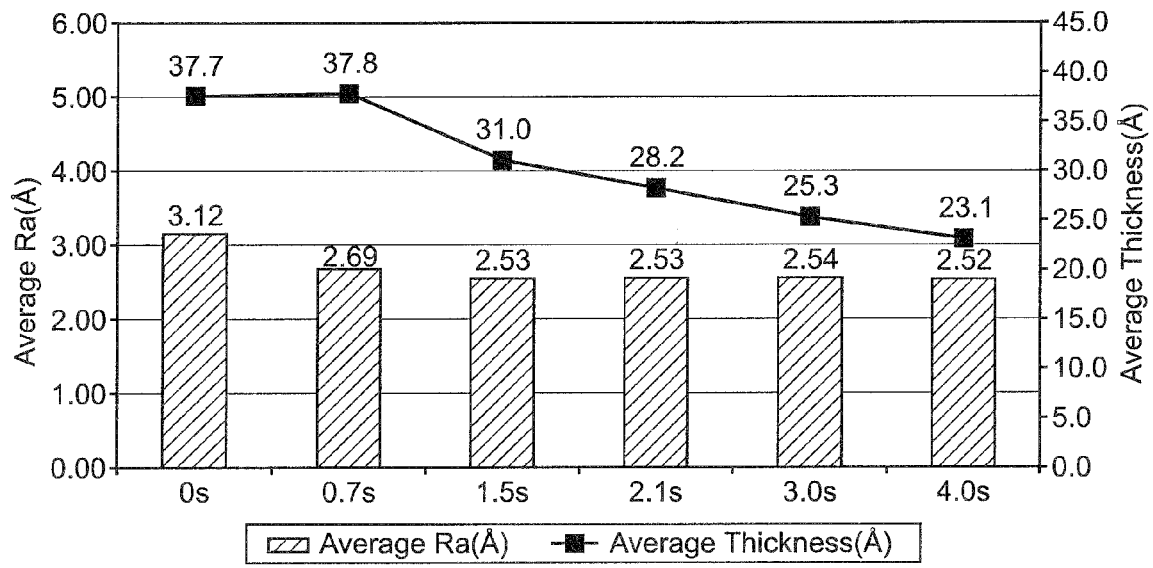
FIG. 3 is a combination bar and line graph, where the bar portion illustrates the surface roughness (Ra) of a carbon overcoat of a magnetic media workpiece after etching versus the etch time and the line portion illustrates the thickness of the carbon overcoat versus the etch time in accordance with one embodiment of the invention.

FIG. 3 is a combination bar and line graph, where the bar portion illustrates the surface roughness (Ra) of a carbon overcoat of a magnetic media workpiece after etching versus the etch time and the line portion illustrates the thickness of the carbon overcoat versus the etch time in accordance with one embodiment of the invention. As can be seen from FIG. 3, the surface roughness (Ra) is significantly reduced after ICP etching due to both the etching process itself and the smoothing effect due to the initial deposition of the thick carbon layer. It is also apparent that the longer the etching process extends, the lower the surface roughness becomes. However, once the etching process extends such that the thick carbon is removed from the valleys in the recording media, the surface roughness will begin to increase. So an optimum amount of etching includes leaving a very thin layer of carbon that is thick enough to extend just beyond the top of the highest peaks of the original recording media. As can also be seen from FIG. 3, surface roughness can be substantially reduced as compared to the levels found in conventional media. In particular embodiments, surface roughness can be reduced by up to 37 percent or more.

Figure 4:
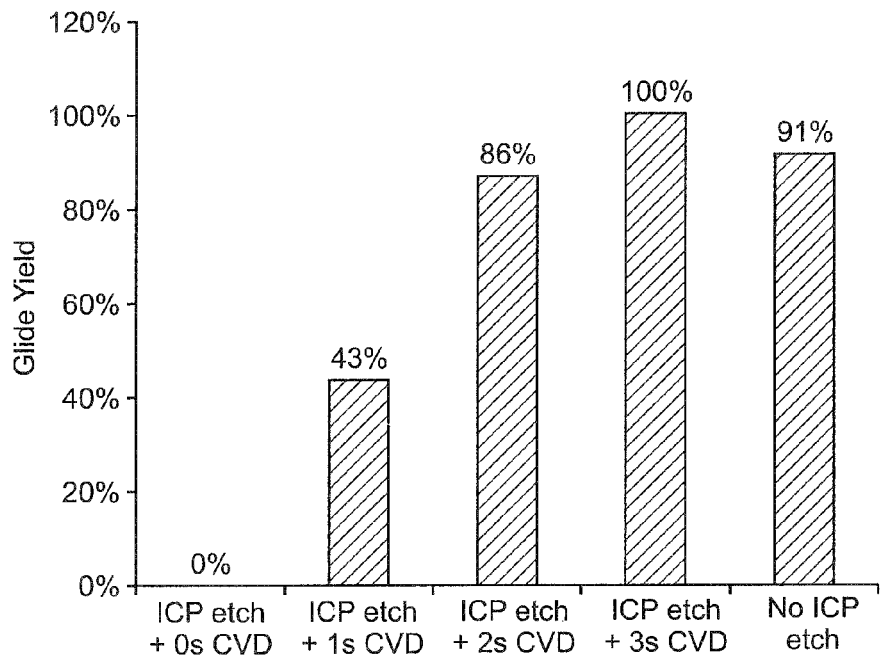
FIG. 4 is a bar graph illustrating resulting glide yield for a magnetic media workpiece having been processed to reduce the surface roughness using carbon etching in accordance with one embodiment of the invention.

FIG. 4 is a bar graph illustrating resulting glide yield for a magnetic media workpiece having been processed to reduce the surface roughness using carbon etching in accordance with one embodiment of the invention. Particularly, FIG. 4 illustrates the resulting glide yield after a deposition of a thin carbon layer to repair the carbon surface of the recording media workpiece. The vertical axis illustrates the glide yield percentage. The horizontal axis illustrates whether ICP etching was performed and the duration of the thin carbon layer deposition by chemical vapor deposition (CVD) in seconds. For the first four workpiece data points, ICP etching was performed for about 10 seconds (e.g., for an EAMR system). For the last workpiece, no ICP etching was performed. As can been seen in FIG. 4 for the fourth data point/workpiece, ICP etching was performed for about 10 seconds followed by thin carbon CVD for about 3 seconds which resulted in the best glide yield at 100 percent. If the duration of the thin carbon CVD is greater than 3 seconds, the glide yield should remain at about 100 percent. In several embodiments, an acceptable glide yield is dependent on proper nitrogen implantation which promotes lube adhesion, among other benefits.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for reducing surface roughness of magnetic media, the method comprising:
   forming a recording media on a substrate, the recording media comprising at least one recording layer configured to store information magnetically, wherein the recording media comprises a plurality of peaks separated by a plurality of valleys and a first surface roughness;
   depositing a first carbon layer directly on the recording media in a single deposition, the first carbon layer having a first average preselected thickness, a second surface roughness, wherein the second surface roughness is less than the first surface roughness;
   etching the first carbon layer to have a second average preselected thickness less than the first average preselected thickness, wherein the second average preselected thickness is greater than a height of any of the plurality of peaks in the recording media;
   depositing a second carbon layer on the etched first carbon layer, the second carbon layer having a third average preselected thickness that is less than the first average preselected thickness; and
   implanting nitrogen in the second carbon layer.

2. The method of claim 1, wherein the etching the first carbon layer to have the second average preselected thickness comprises etching, using an inductively coupled plasma, the first carbon layer to have the second average preselected thickness.

3. The method of claim 2, wherein the inductively coupled plasma comprises Argon.

4. The method of claim 2, wherein the implanting the nitrogen in the second carbon layer comprises implanting the nitrogen in the second carbon layer using an inductively coupled plasma comprising the nitrogen.

5. The method of claim 4, wherein the etching, using the inductively coupled plasma, the first carbon layer to have the second average preselected thickness and the implanting the nitrogen in the second carbon layer using the inductively coupled plasma comprising the nitrogen are performed in the same chamber.

6. The method of claim 1:
   wherein the first average preselected thickness is greater than a depth of any of the plurality of valleys in the recording media.

7. The method of claim 6, wherein the second average preselected thickness is selected to minimize a surface roughness of the first carbon layer after the etching the first carbon layer.

8. The method of claim 6, wherein the first average preselected thickness of the first carbon layer is at least twice as much as a depth of any of plurality of valleys in the recording media.

9. The method of claim 1, wherein the first average preselected thickness of the first carbon layer is at least three times as much as the third average preselected thickness of the second carbon layer.

10. The method of claim 1:
    wherein the recording media comprises a plurality of peaks separated by a plurality of valleys; and
    wherein the depositing the first carbon layer on the recording media comprises filling each of the plurality of valleys in the recording media.

11. The method of claim 1, wherein the depositing the first carbon layer on the recording media comprises substantially reducing a surface roughness of a top surface of the recording media.

12. The method of claim 11, wherein the depositing the second carbon layer on the etched first carbon layer comprises restoring a top surface of the etched first carbon layer.

13. The method of claim 1, wherein the first average preselected thickness is selected to substantially reduce a surface roughness of a top surface of the recording media.

14. The method of claim 1, wherein the first average preselected thickness is between about 35 angstroms and about 40 angstroms.

15. The method of claim 1, wherein the second average preselected thickness is about 15 angstroms.

16. The method of claim 1, wherein the third average preselected thickness is about 5 angstroms and about 10 angstroms.

17. The method of claim 1, wherein the etching the first carbon layer comprises etching about 20 percent of the first carbon layer.

18. The method of claim 1, wherein the etching the first carbon layer comprises etching about 80 percent to about 90 percent of the first carbon layer.

* * * * *